United States Patent
Kaneko

(10) Patent No.: US 11,509,797 B2
(45) Date of Patent: Nov. 22, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Chiaki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 16/875,784

(22) Filed: May 15, 2020

(65) Prior Publication Data

US 2020/0374420 A1    Nov. 26, 2020

(30) Foreign Application Priority Data

May 22, 2019    (JP) .............................. JP2019-095935

(51) Int. Cl.
*H04N 1/60* (2006.01)
*G06T 19/20* (2011.01)
(Continued)

(52) U.S. Cl.
CPC ............. *H04N 1/6077* (2013.01); *G06T 5/50* (2013.01); *G06T 7/90* (2017.01); *G06T 19/20* (2013.01); *H04N 1/6086* (2013.01); *G06T 5/008* (2013.01); *G06T 2207/10024* (2013.01); *G06T 2207/10152* (2013.01); *G06T 2207/20221* (2013.01);
(Continued)

(58) Field of Classification Search
CPC ...... H04N 1/6077; H04N 1/62; H04N 1/6086; G06T 19/20; G06T 7/90; G06T 2207/30201; G06T 2219/2012; G06T 2207/10024; G06T 2207/20221;
(Continued)

(56) References Cited

U.S. PATENT DOCUMENTS

2005/0243175 A1* 11/2005 Yamada ................. H04N 9/735
                                                                    348/207.1
2009/0033753 A1*  2/2009 Sato ........................ G01S 17/89
                                                                    348/217.1
(Continued)

FOREIGN PATENT DOCUMENTS

JP        2016-144042 A    8/2016

*Primary Examiner* — Ping Y Hsieh
*Assistant Examiner* — Daniella M. DiGuglielmo
(74) *Attorney, Agent, or Firm* — Canon U.S.A., Inc. IP Division

(57) ABSTRACT

An apparatus includes a generation unit configured to generate shape information of an object in a captured image, a component acquisition unit configured to acquire an auxiliary light component representing intensity of an auxiliary light at each pixel of the captured image based on a light amount characteristic representing a light amount of the auxiliary light received by the object when the auxiliary light is emitted and the shape information of the object, a first correction unit configured to generate a first corrected image in which color of the captured image is corrected according to environmental light, a second correction unit configured to generate a second corrected image in which color of the captured image is corrected according to the auxiliary light, and a combining unit configured to combine the first corrected image and the second corrected image at a combination ratio calculated based on the auxiliary light component.

14 Claims, 12 Drawing Sheets

(51) Int. Cl.
  *G06T 7/90*  (2017.01)
  *G06T 5/50*  (2006.01)
  *G06T 5/00*  (2006.01)
  *H04N 1/62*  (2006.01)

(52) U.S. Cl.
  CPC ............... *G06T 2207/30196* (2013.01); *G06T 2207/30201* (2013.01); *G06T 2219/2012* (2013.01); *H04N 1/62* (2013.01)

(58) Field of Classification Search
  CPC . G06T 2207/10152; G06T 2207/30196; G06T 5/008; G06T 5/50
  See application file for complete search history.

(56) References Cited

U.S. PATENT DOCUMENTS

| | | | | |
|---|---|---|---|---|
| 2010/0201840 | A1* | 8/2010 | Ajito | H04N 9/735 348/223.1 |
| 2012/0057044 | A1* | 3/2012 | Shimizu | H04N 1/6077 348/223.1 |
| 2015/0310673 | A1* | 10/2015 | Romdhani | G06T 19/20 345/420 |
| 2016/0227182 | A1* | 8/2016 | Uekusa | H04N 9/04515 |
| 2017/0084068 | A1* | 3/2017 | Son | G06K 9/00208 |
| 2017/0094240 | A1* | 3/2017 | Saito | G06T 5/008 |

* cited by examiner

IMAGE PROCESSING APPARATUS, IMAGE PROCESSING METHOD, AND STORAGE MEDIUM

BACKGROUND

Field of the Disclosure

The present disclosure relates to an image processing technique for adjusting a white balance of an image.

Description of the Related Art

Conventionally, for example, a technique discussed in Japanese Patent Application Laid-Open No. 2016-144042 which automatically adjusts a white balance by using information about a distance in a depth direction of an object has been known as a technique for adjusting a color tone of an image captured by an image capturing apparatus such as a digital camera when emitting auxiliary light such as flash light. In this technique, a plurality of captured images with disparities is acquired by a micro lens array, and a distance image is generated by calculating distance information for each of the optional areas in an image based on the captured images with disparities. Then, based on the acquired distance image, a contribution rate of the flash light in the captured image is calculated, and a white balance is corrected based on the contribution rate. With this processing, a white balance can be appropriately corrected even if there is a difference in color between light different from flash light (i.e., environmental light) and flash light.

However, in order to acquire the distance image through the above-described technique, a complicated mechanism such as the micro lens array is necessary. Therefore, a cost of the image capturing apparatus will be increased. Further, an image having sufficient disparity cannot be acquired depending on an image capturing condition such as an aperture value, so that accuracy of the distance image is lowered, and a contribution rate of flash light cannot be appropriately acquired. Therefore, it is difficult to appropriately correct the white balance.

SUMMARY

According to embodiments of the present disclosure, an image processing apparatus includes an image acquisition unit configured to acquire an image captured in a state where auxiliary light is emitted under environmental light, a generation unit configured to generate shape information of an object by applying a three-dimensional shape model to an area of the object included in the captured image, a component acquisition unit configured to acquire an auxiliary light component representing intensity of the auxiliary light at each pixel of the captured image based on a light amount characteristic representing a light amount of the auxiliary light received by the object when the auxiliary light is emitted and the shape information of the object, a first correction unit configured to generate a first corrected image in which color of the captured image is corrected according to the environmental light, a second correction unit configured to generate a second corrected image in which color of the captured image is corrected according to the auxiliary light, and a combining unit configured to combine the first corrected image and the second corrected image at a combination ratio calculated based on the auxiliary light component.

Further features of the present disclosure will become apparent from the following description of exemplary embodiments with reference to the attached drawings.

DESCRIPTION OF THE EMBODIMENTS

Figure 1:
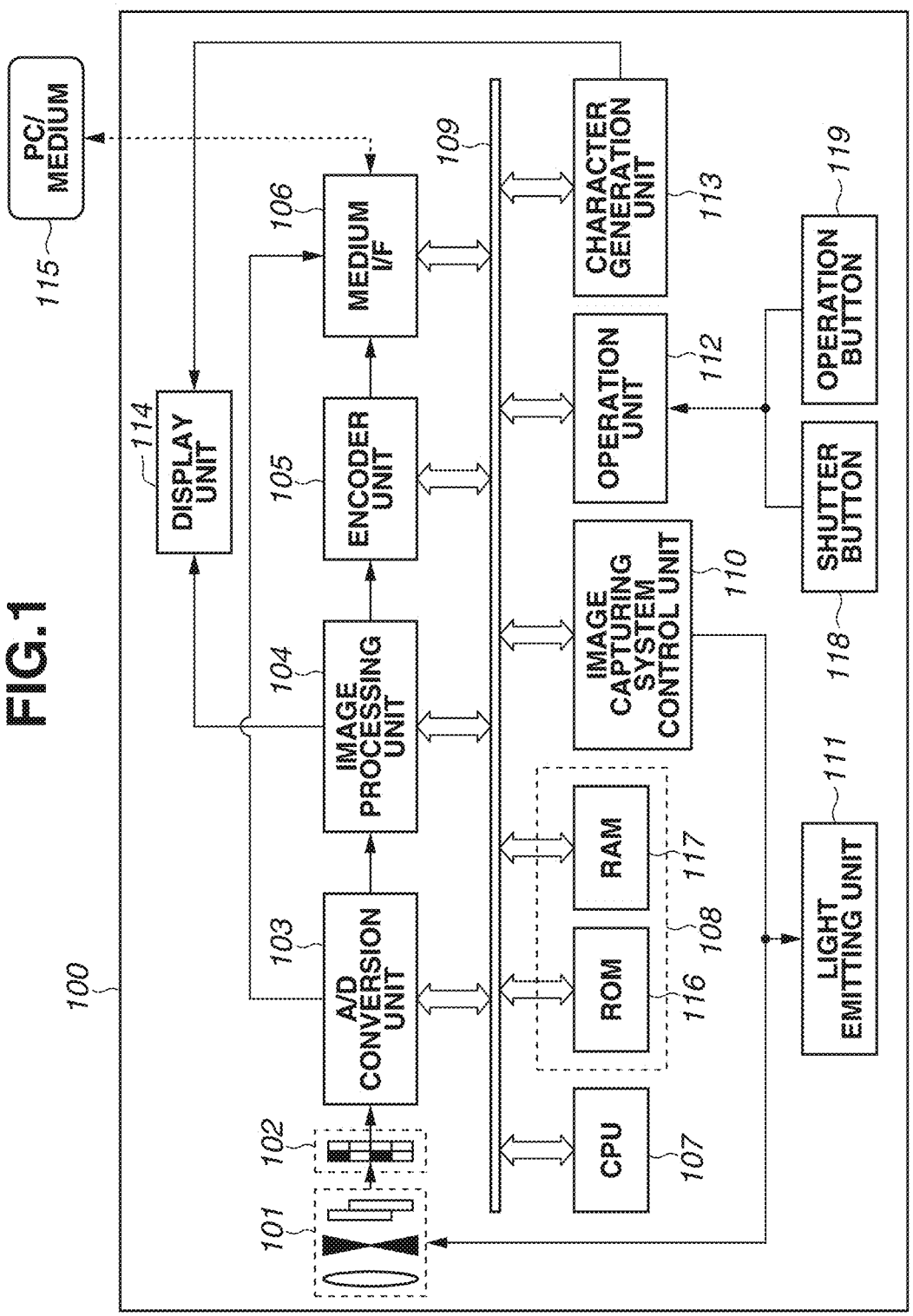
FIG. 1 is a block diagram illustrating a configuration example of an image processing apparatus according to a first exemplary embodiment.

Hereinafter, exemplary embodiments of the present disclosure will be described with reference to the appended drawings. The embodiments described hereinafter are not intended to limit the content of the present disclosure, and not all of the combinations of features described in the present exemplary embodiments are necessarily required. Further, the same reference numerals are applied to the configurations similar to each other.

In the first exemplary embodiment, a captured image is acquired while emitting flash light under environmental light, and the color of the captured image is adjusted according to a light source. FIG. 1 is a block diagram illustrating an example of a hardware configuration of an image processing apparatus according to the present exemplary embodiment.

An image capturing apparatus 100 such as a digital camera will be described as an application example of the image processing apparatus according to the present exemplary embodiment. The image capturing apparatus 100 includes an optical unit 101, an image sensor unit 102, an analog-to-digital (A/D) conversion unit 103, an image processing unit 104, an encoder unit 105, a medium interface (I/F) 106, a central processing unit (CPU) 107, a memory unit 108, and a system bus 109. The image capturing apparatus 100 further includes an image capturing system control unit 110, a light emitting unit 111, an operation unit 112, a character generation unit 113, and a display unit 114.

The optical unit 101 is a lens barrel configured of a zoom lens, a focus lens, a camera-shake correction lens, an aperture, and a shutter, and causes an optical image of an object to be formed on an imaging face of the image sensor unit 102.

The image sensor unit 102 includes an image sensor which converts an optical image formed by the optical unit 101 into an analog electric signal. The image sensor unit 102 further includes a color filter configured of filter elements in respective colors of red (R), green (G), and blue (B) arranged in a predetermined array such as the Bayer array, and separates light from the object collected by the optical unit 101 into respective color components.

The A/D conversion unit 103 converts signals of respective color components of the object acquired by the image sensor unit 102 to digital signals. Image data consisting of a digital signal generated by the A/D conversion unit 103 through A/D conversion is output to the image processing unit 104 as RAW image data. Further, if the image capturing apparatus 100 is set to record or externally output the RAW image data, for example, the RAW image data output from the A/D conversion unit 103 is output to a PC/medium 115 via the below-described medium I/F 106.

The image processing unit 104 is a processing circuit which executes development processing on the RAW image data generated by the A/D conversion unit 103 to generate color image data. Further, the image processing unit 104 executes various types of image processing including white balance (WB) correction processing with respect to the color image data. An internal configuration of the image processing unit 104 will be described below in detail. Further, when image processing is to be executed, the image processing unit 104 stores image data in the memory unit 108 and read out the image data as appropriate.

The encoder unit 105 is a processing circuit which converts various types of image data processed by the image processing unit 104 to data of a file format such as JPEG.

The medium I/F 106 is an interface for transmitting/receiving image data to/from the PC/medium 115. The PC/medium 115 is a personal computer or a recording medium such as a hard disk, a memory card, a compact flash (CF) (registered trademark) card, or a secure digital (SD) card. For example, a universal serial bus (USB) is used as the medium I/F 106.

The CPU 107 is involved in processing and control of the entire constituent elements included in the image capturing apparatus 100. The CPU 107 sequentially reads and analyzes the commands stored in the memory unit 108 configured of a read only memory (ROM) 116 and a random access memory (RAM) 117, and executes processing based on the analysis result.

In the present exemplary embodiment, it is assumed that standard shape information and a light amount characteristic described below are previously stored in the ROM 116. The standard shape information and the light amount characteristic will be described below in detail.

The system bus 109 is a bus which enables the internal constituent elements of the image capturing apparatus 100 to mutually transmit and receive data.

The image capturing system control unit 110 is a control circuit which executes on the optical unit 101 various types of control relating to the image capturing system, e.g., focus adjustment control, shutter opening control, and aperture adjustment control.

The light emitting unit 111 is an auxiliary light source which emits auxiliary light (so-called flash light) for supplementing illumination light when image capturing is executed. A built-in flash device of a camera or an external flash device may be used as the auxiliary light source. Light emitting operations such as emission and non-emission of flash light executed by the light emitting unit 111 is controlled by the image capturing system control unit 110.

The operation unit 112 receives a signal from a shutter button 118 or an operation button 119 and transmits a user instruction for capturing images or changing a setting of the camera to the CPU 107. The shutter button 118 can be brought into two states, i.e., a half-pressed state and a full-pressed state.

The character generation unit 113 is a processing circuit which generates character data and graphic data. The character data and the graphic data generated by the character generation unit 113 are superimposed on various types of image data, and transmitted to and displayed on the display unit 114.

The display unit 114 is a liquid crystal display which displays various types of image data and a camera setting menu.

In the image capturing apparatus 100 of the present exemplary embodiment, when the shutter button 118 is not operated, the image capturing system control unit 110 controls the optical unit 101 and the image sensor unit 102 to execute image capturing at a predetermined frame period and acquires a so-called live-view display image.

When the shutter button 118 is pressed halfway, the image capturing system control unit 110 controls the optical unit 101 to execute auto-focus (AF) locking and auto-exposure (AE) locking. The AF locking refers to operation for locking a focal distance when auto-focus control for driving a focus lens within the optical unit 101 is executed. The AE locking refers to operation for locking an exposure value when auto-exposure control is executed.

Thereafter, when the shutter button 118 is fully pressed, the image capturing system control unit 110 controls the optical unit 101 and the image sensor unit 102, and further controls a flash device of the light emitting unit 111 to emit light, so that the main exposure operation for actually capturing an object image is executed. Thereby, RAW image data is acquired through the image capturing operation executed in a flash light emitted state.

Herein, when the image is captured through the main exposure operation, the image capturing apparatus 100 of the present exemplary embodiment acquires an image captured in a state where flash light is emitted and an image captured in a state were flash light is not emitted. In other words, in the present exemplary embodiment, when the shutter button 118 is fully pressed, the image capturing system control unit 110 controls the optical unit 101 and the image sensor unit 102, and further controls the light emitting unit 111 to emit flash light, so that a main exposure operation for actually capturing an object image is executed. Thereby, RAW image data is acquired through the image capturing operation executed in a flash light emitted state. Subsequently, the image capturing system control unit 110 controls the optical unit 101 and the image sensor unit 102, and further controls the light emitting unit 111 not to emit flash light, so that exposure operation for capturing an object image is executed. Thereby, RAW image data is acquired through image capturing operation executed in a flash light non-emitted state. Exposure operation in a flash light non-emitted state may be executed after the shutter button 118 is fully pressed before the main exposure operation is started.

The RAW image data acquired through image capturing executed in a flash light emitted state is image data which is acquired through image capturing executed by the image sensor unit 102 when flash light is emitted from the light emitting unit 111 and output from the A/D conversion unit 103. Further, the RAW image data acquired through image capturing executed in a flash light non-emitted state is image data which is acquired through image capturing executed by the image sensor unit 102 under environmental light without making the light emitting unit 111 emit flash light and output from the A/D conversion unit 103. The pieces of RAW image data are temporarily stored in the memory unit 108.

Next, the image capturing apparatus 100 of the present exemplary embodiment executes de-mosaic processing and noise reduction processing on the RAW image data acquired in a flash light emitted state to generate color image data for flash light. Hereinafter, a color image for flash light is called as a flash light emitted image, and image data thereof is called as flash light emitted image data Ion. Similarly, the image capturing apparatus 100 executes de-mosaic processing and noise reduction processing on the RAW image data acquired in a flash light non-emitted state to generate color image data for environmental light without including flash light. Hereinafter, a color image for environmental light without including the flash light is called as a flash light non-emitted image, and image data thereof is called as flash light non-emitted image data Ioff. The acquisition method of the flash light emitted image data and the flash light non-emitted image data is not limited to the method described above. For example, the pieces of color image data may be generated by reading and processing the RAW image data stored in the PC/medium 115. Alternatively, color image data stored in the memory unit 108 or the PC/medium 115 may be read and acquired as the pieces of color image data.

Further, the image capturing apparatus 100 of the present exemplary embodiment applies a previously-provided three-dimensional shape model to a specific object area included in the flash light emitted image to generate shape information of that specific object.

Then, based on the acquired shape information and the previously-provided light amount characteristic, the image capturing apparatus 100 calculates a contribution rate of flash light with respect to each pixel of the flash light emitted image. In the present exemplary embodiment, the shape information is a normal line map having a normal vector of an object surface corresponding to each pixel of a captured image as a pixel value. The light amount characteristic is a function $F(Yfon, Yfoff)$ which takes an average luminance Yfon of an object area in the flash light emitted image and an average luminance Yfoff of an object area in the flash light non-emitted image as inputs, and provides an incident light amount Es of flash light received by the object as an output. The contribution rate of flash light, the shape information, and the light amount characteristic will be described below in detail. Further, in the present exemplary embodiment, it is assumed that flash light is incident on the object with uniform energy regardless of the position of incidence. In other words, the incident light amount Es of the flash light received by the object is uniform regardless of a position in the image.

Further, the image capturing apparatus 100 of the present exemplary embodiment generates a white balance corrected image for flash light and a white balance corrected image for environmental light based on the contribution rate of the flash light. The white balance corrected image for the flash light refers to an image obtained by adjusting a color of a captured image according to the flash light. Further, the white balance corrected image for environmental light refers to an image obtained by adjusting a color of a captured image according to the environmental light. Hereinafter, "white balance" is expressed as "WB". The image capturing apparatus 100 further acquires a combination ratio for combining the WB corrected image for the flash light and the WB corrected image for the environmental light. Then, the image capturing apparatus 100 combines the WB corrected image for the flash light emitted image and the WB corrected image for the flash light non-emitted image according to the combination ratio to acquire a final WB corrected image. The WB corrected image and the combination ratio will be described below in detail.

Figure 2:
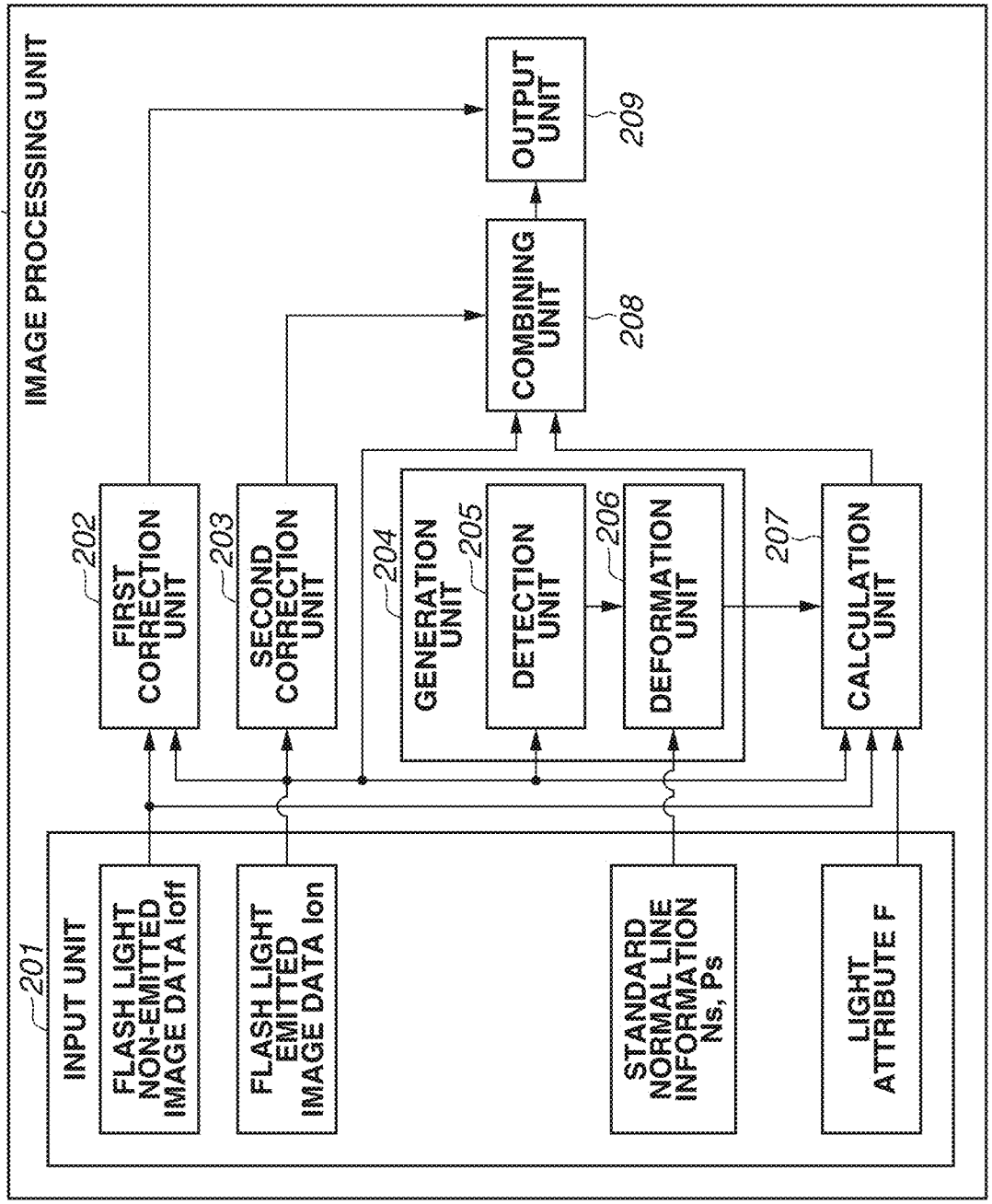
FIG. 2 is a block diagram illustrating a configuration example of an image processing unit according to the first exemplary embodiment.

FIG. 2 is a block diagram illustrating an internal configuration of the image processing unit 104 included in the image capturing apparatus 100 of the present exemplary embodiment. The image processing unit 104 executes processing for generating the final WB corrected image from the image data captured as described above.

An input unit 201 executes image acquisition processing for reading out the RAW image data acquired through image capturing executed in a flash light emitted state from the memory unit 108. Then, the input unit 201 executes de-mosaic processing and noise reduction processing on that RAW image data to generate flash light emitted image data Ion. The generated flash light emitted image data Ion is transmitted to a first correction unit 202, a second correction unit 203, a generation unit 204, a calculation unit 207, and a combining unit 208.

Further, the input unit 201 executes image acquisition processing for reading out the RAW image data acquired through image capturing executed in a flash light non-emitted state from the memory unit 108. Then, with respect to that RAW image data, the input unit 201 executes processing similar to the processing for generating the flash light emitted image data Ion to generate flash light non-emitted image data Ioff, and transmits the flash light non-emitted image data Ioff to the first correction unit 202 and the calculation unit 207.

Figure 3A:
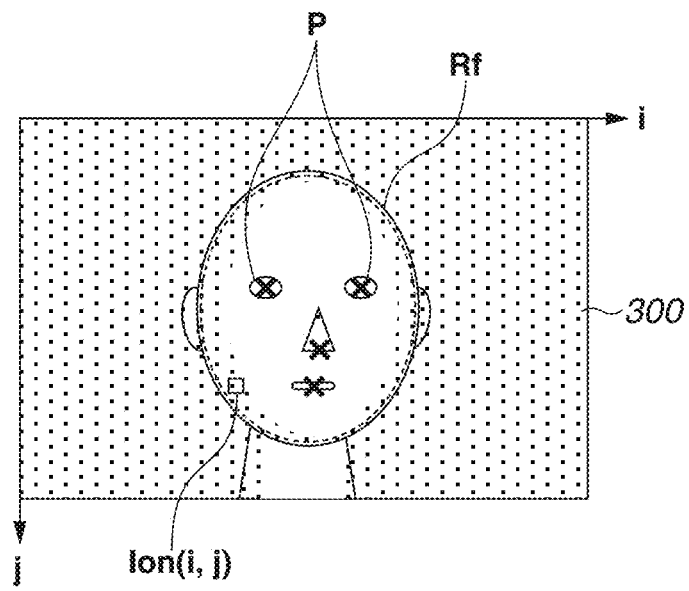
FIGS. 3A and 3B are diagrams illustrating examples of a flash light emitted image and a flash light non-emitted image.
Figure 3B:
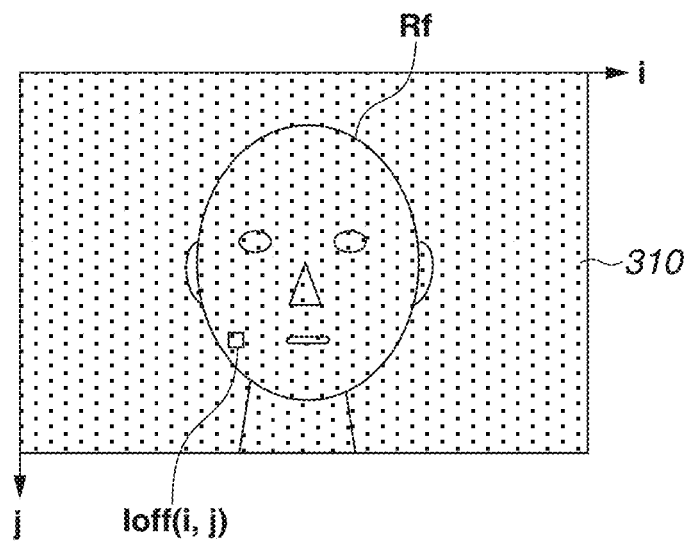

FIGS. 3A and 3B are diagrams illustrating examples of captured images of a human face as a specific object. FIG. 3A illustrates an example of a flash light emitted image 300, whereas FIG. 3B illustrates an example of a flash light non-emitted image 310. In a pixel $Ion(i, j)$ of the flash light emitted image 300 illustrated in FIG. 3A, RGB values ($IonR(i, j)$, $IonG(i, j)$, $IonB(i,j)$) of the object in a flash light emitted state are stored as the pixel value. Similarly, in a pixel $Ioff(i, j)$ of the flash light non-emitted image 310 illustrated in FIG. 3B, RGB values ($IoffR(i, j)$, $IoffG(i, j)$, $IoffB(i, j)$) of the object in a flash light non-emitted state are stored as the pixel value. Further, data of a face portion of the flash light emitted image illustrated in FIG. 3A includes information about a face area Rf and an organ position P. The face area Rf is a group of pixels constituting the object's face, which is an area in the flash light emitted image 300 occupied by the object's face. The organ position P represents information about position coordinates in an image of each organ such as the eye or the mouth within the face area Rf. The processing for acquiring the information about the face area Rf and the organ position P will be described below in detail.

The input unit 201 reads the below-described standard shape information from the ROM 116 and transmits the standard shape information to the generation unit 204. The input unit 201 further reads the light amount characteristic from the ROM 116 and transmits the light amount characteristic to the calculation unit 207.

Figure 4:
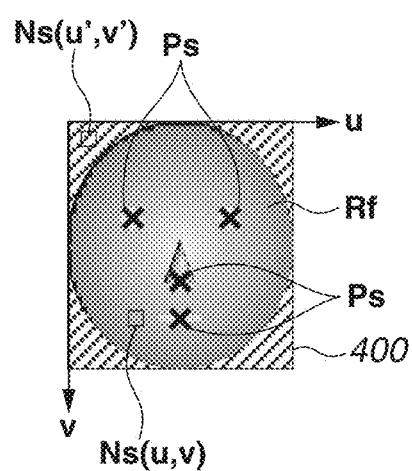
FIG. 4 is a diagram illustrating an example of standard shape information.

FIG. 4 is a diagram illustrating an example of standard shape information 400 previously provided as a three-dimensional shape model. The standard shape information 400 is provided as a three-dimensional shape model of the human face area Rf. The standard shape information consists of a standard normal line map Ns and an organ position Ps corresponding thereto. The standard normal line map Ns is image data which includes, as a pixel value, normal line information of the face previously created based on a general shape of the face. In the standard shape information, x-y-z component values (Nsx(u, v), Nsy(u, v), Nsz(u, v)) of a normal unit vector of a face surface are stored in a pixel Ns(u, v) in the face area as the pixel value. Further, a null value which represents non-existence of the normal vector is stored in a pixel in a shaded area outside the face area in FIG. 4. With this configuration, the face area and the non-face area can be distinguished from each other based on the pixel value in the normal line map. Further, the organ position Ps represents position coordinates of each organ such as the eye, the nose, or the mouth in the standard normal line map Ns.

The light amount characteristic according to the present exemplary embodiment is a characteristic which represents a light amount of flash light received by the object according to the luminance of the flash light emitted image and the luminance of the flash light non-emitted image. Specifically, the light amount characteristic of the present exemplary embodiment is a function F(Yfon, Yfoff) which takes an average luminance Yfon of a face area in the flash light emitted image and an average luminance Yfoff of a face area in the flash light non-emitted image as inputs and provides a flash light amount Es received by the object as an output. In the present exemplary embodiment, through a method described below, for example, the function F (Yfon, Yfoff) is previously created and stored in the ROM 116 in a form of a look-up table (LUT). In addition, the function F(Yfon, Yfoff) may be created and stored in the ROM 116 in a form of a numerical expression.

When the function F(Yfon, Yfoff) is generated, images of a person's face as a sample are captured in a flash light emitted state and a flash light non-emitted state. Further, illuminance of a front side of the face (i.e., a side right in front of the image capturing apparatus) is measured by an illuminance meter when the images are captured. Next, an average luminance Yfon of the face area in a flash light emitted state and an average luminance Yfoff of the face area in a flash light non-emitted state are calculated from the images acquired through the image capturing operation. Further, a difference calculated by subtracting the illuminance in a flash light non-emitted state from the illuminance in a flash light emitted state is acquired as the flash light amount Es received by the object. Furthermore, a pair of the average luminance Yfon of the face area in a flash light emitted state and the average luminance Yfoff of the face area in a flash light non-emitted state (Yfon, Yfoff) is associated with the flash light amount Es received by the object. Then, the pair of average luminance values (Yfon, Yfoff) acquired from images captured by variously changing the object distance, the environmental light, and the flash light emitting amount is associated with the flash light amount Es as described above, and an LUT or a relational expression is created from a correspondence relationship acquired therefrom.

In addition, a creation method of the light amount characteristic is not limited to the above-described method. For example, a distance from the image capturing apparatus 100 to the object's face when an image is captured in a flash light emitted state is measured, and the flash light amount Es received by the object may be acquired based on the known flash light emitting amount and the measured distance. Further, a difference value $\Delta Y(=Yfon-Yfoff)$ of the average luminance value may be associated with the flash light amount Es received by the object. Furthermore, instead of using the average luminance of the face area, an average luminance of a skin area or a luminance of a specific portion within the face area may be used.

The internal configuration will be described with reference to FIG. 2 again.

The first correction unit 202 calculates a white balance correction coefficient (WB correction coefficient) for the environmental light based on the flash light non-emitted image data Ioff, and generates WB corrected image data I'1 for the environmental light from the flash light emitted image data Ion by using this WB correction coefficient. The generated image data I'1 is transmitted to the combining unit 208.

The second correction unit 203 generates WB corrected image data I'2 for the flash light based on the flash light emitted image data Ion. The generated WB corrected image data I'2 is transmitted to the combining unit 208.

The generation unit 204 includes a detection unit 205 and a deformation unit 206.

The detection unit 205 detects face information of the object from the flash light emitted image data Ion and transmits the detected face information to the deformation unit 206. The face information of the object includes information about a face area representing an area in the image occupied by the object's face and organ positions in the image representing position coordinates of e organs included in the face, i.e., the eyes and the nose.

From the flash light emitted image 300 illustrated in FIG. 3A, the detection unit 205 acquires information relating to the face area Rf representing the area occupied by the object's face in the image and position coordinates representing the organ position P of each organ such as the eye or the mouth in the image. The detection unit 205 acquires the information relating to the face area Rf and the organ position P by using a face detection method employing template matching or the Haar-Like feature amount.

Hereinafter, the exemplary of embodiment will be described with respect to the case where the detection unit 205 detects the face area Rf and the organ position P through the template matching.

First, the detection unit 205 detects a skin color area by executing threshold value processing using a threshold value of the skin color on the flash light emitted image data Ion and specifies the skin color area as a candidate face area. Then, by using a face image template previously provided, the detection unit 205 executes matching processing on the candidate face area, and calculates a likelihood. Next, based on the likelihood, the detection unit 205 executes processing for determining whether the candidate face area is the face area. If the candidate face area is determined to be the face area, the detection unit 205 extracts the candidate face area as the face area. Further, with respect to each of the pixels within the extracted face area, the detection unit 205 calculates a likelihood through matching processing using an image template corresponding to each of the organs such as the eyes, the nose, and the mouth. Then, the detection unit 205 determines that the position of the pixel having high likelihood is the position of the organ. Through the above-described processing, the detection unit 205 detects the face area Rf and the organ position P.

The deformation unit 206 executes processing for deforming and applying the three-dimensional shape model to make positions of organs of the face in the previously-provided three-dimensional shape model substantially conform to positions of organs of the face that the detection unit 205 has detected from the captured image. In the present exemplary embodiment, based on the face information acquired by the detection unit 205, the deformation unit 206 generates a normal line map corresponding to the flash light emitted image by deforming the standard normal line map Ns included in the standard shape information as the three-dimensional shape model.

Figure 5:
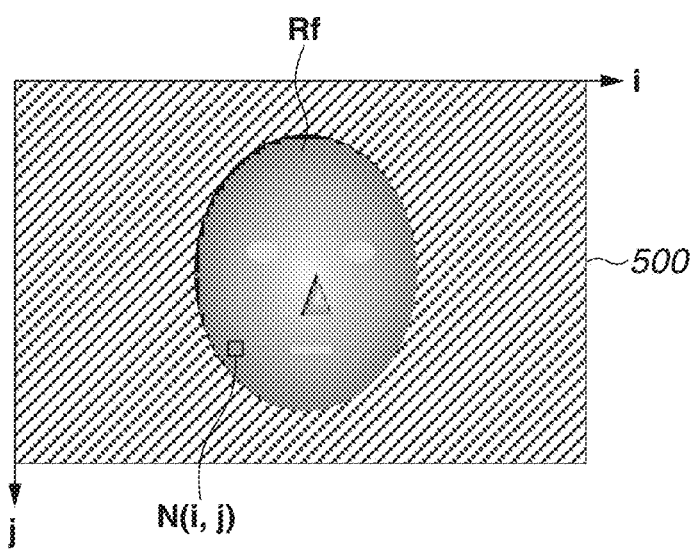
FIG. 5 is a diagram illustrating an example of a normal line map.

FIG. 5 is a diagram illustrating an example of a normal line map 500 corresponding to the flash light emitted image 300 in FIG. 3A. In a pixel N(i, j) of the normal line map 500, values of respective elements of the unit normal vector for the object's face are stored as the pixel value. Specifically, x-y-z component values (Nx(i, j), Ny(i, j), Nz(i, j)) of the unit normal vector corresponding to the pixel Ion(i, j) within the face area Rf of the flash light emitted image are stored as pixel value S of the pixel N(i, j). Further, a value representing non-existence of the normal vector is stored in each pixel in a shaded area outside the face area in FIG. 5. In the present exemplary embodiment, a horizontal direction, a vertical direction, and an optical axis direction of the image capturing apparatus 100 when the flash light emitted light is captured are respectively specified as an x-axis, a y-axis, and a z-axis. The processing executed by the generation unit 204 will be described below in detail. The normal line map N generated by the generation unit 204 is transmitted to the calculation unit 207.

The calculation unit 207 uses the normal line map and the light amount characteristic to execute component acquisition processing for calculating a flash light component Ys(i, j) as an auxiliary light component corresponding to each pixel Ion(i, j) of the flash light emitted image. The processing executed by the calculation unit 207 will be described below in detail. The flash light component Ys(i, j) calculated by the calculation unit 207 is transmitted to the combining unit 208.

Based on the flash light emitted image data Ion and the flash light component, the combining unit 208 calculates a combination ratio of images and combines the WB corrected image data I'1 for the environmental light and the WB corrected image data I'2 for the flash light by using this combination ratio. The image data generated by the combining unit 208 through combining processing is transmitted to the output unit 209 as the final WB corrected image data I".

The output unit 209 outputs the WB corrected image data I" generated by the combining unit 208 to the subsequent-stage processing unit. In addition, the output unit 209 may execute color processing such as gamma processing thereon before outputting the WB corrected image data I".

Figure 6:
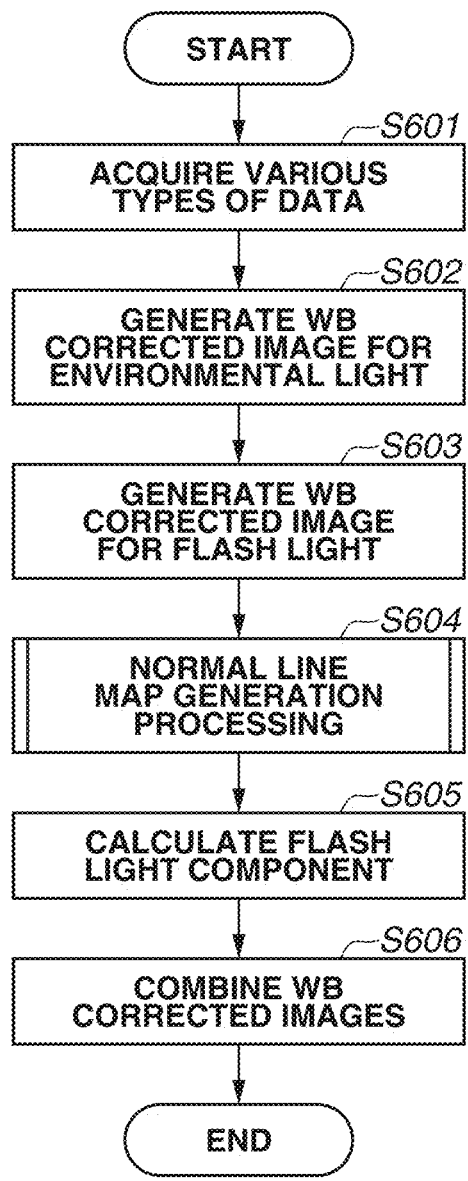
FIG. 6 is a flowchart of image processing according to the first exemplary embodiment.

FIG. 6 is a flowchart illustrating a series of processing executed by the image processing unit 104 in FIG. 2. The series of processing illustrated in the flowchart in FIG. 6 may be realized by a software configuration or a hardware configuration. For example, the hardware configuration that realizes the processing of the flowchart in FIG. 6 includes circuits corresponding to constituent elements of the image processing unit 104 illustrated in FIG. 2. Further, in a case where the processing of the flowchart in FIG. 6 is realized by the software configuration, a computer-executable program describing the processing of the flowchart in FIG. 6 is read from a ROM to a RAM, and a CPU executes the program to realize the processing. In a case where the processing of the flowchart FIG. 6 is realized by the software configuration, the constituent elements illustrated in FIG. 2 are formed by the CPU. Furthermore, the processing of the flowchart in FIG. 6 may be partially realized by a hardware configuration while the rest is realized with a software configuration such as a program.

First, in step S601, the input unit 201 acquires the flash light emitted image data Ion, the flash light non-emitted image data Ioff, the standard shape information, and information about the light amount characteristic, and transmits the pieces of image data and information to units which execute the subsequent processing.

Next, in step S602, the first correction unit 202 uses the flash light non-emitted image data Toff to calculate the WB correction coefficient for the environmental light, and uses the calculated WB correction coefficient to generate the WB corrected image data I'1 for the environmental light from the flash light emitted image data Ion. The following auto-WB adjustment method can be used for calculating the WB correction coefficient and generating the WB corrected image.

First, the first correction unit 202 calculates average RGB values aveIoffR, aveIoffG, and aveIoffB from the RGB values IoffR(i, j), IoffG(i, j), and IoffB(i, j) of the pixel Ioff(i, j) of the flash light non-emitted image data Ioff. Then, the first correction unit 202 calculates WB correction coefficients ($\alpha r1$, $\alpha g1$, $\alpha b1$) which correct the color expressed by the average RGB values to an achromatic color through the following equations 1 to 3, $$\alpha r1 = aveIoffG/aveIoffR \quad \text{Equation 1}$$

$$\alpha g1 = 1 \quad \text{Equation 2}$$

$$\alpha b1 = aveIoffG/aveIoffB \quad \text{Equation 3}$$

Next, the first correction unit 202 uses the RGB values of each pixel of the flash light emitted image data Ion and the WB correction coefficients calculated as the above to execute calculation of the following equations 4 to 6. Through the calculation, RGB values I'1R(i, j), I'1G(i, j), and I'1B(i, j) of each pixel of the WB corrected image data I'1 for the environmental light are acquired.

$$I'1R(i,j) = IonR(i,j) * \alpha r1 \quad \text{Equation 4}$$

$$I'1G(i,j) = IonG(i,j) * \alpha g1 \quad \text{Equation 5}$$

$$I'1B(i,j) = IonB(i,j) * \alpha b1 \quad \text{Equation 6}$$

In step S603, the second correction unit 203 generates the WB corrected image data I'2 for flash light from the flash light emitted image data Ion. At this time, previously-stored known values may be used as the WB correction coefficients ($\alpha r2$, $\alpha g2$, $\alpha b2$) for flash light, or the WB correction coefficients ($\alpha r2$, $\alpha g2$, $\alpha b2$) may be acquired through the calculation described in step S602 by replacing the flash light non-emitted image data Ioff with the flash light emitted image data Ion. Similar to the processing in step S602, the RGB values I'2R(i, j), I'2G(i, j), and I'2B(i, j) of the WB corrected image I'2 for the flash light can be acquired by multiplying the RGB values of each pixel of the flash light emitted image data Ion by the WB correction coefficients ($\alpha r2$, $\alpha g2$, $\alpha b2$).

In step S604, the generation unit 204 generates the normal line map N corresponding to the flash light emitted image data Ion.

Figure 7:
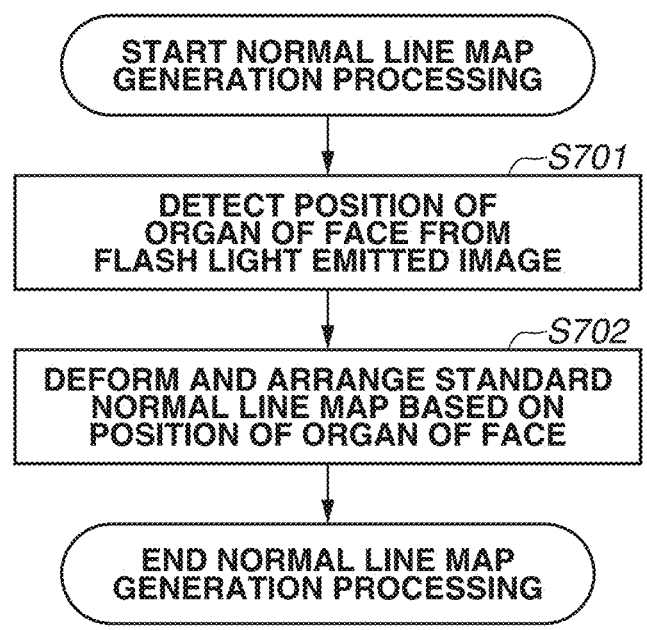
FIG. 7 is a flowchart of normal line map generation processing according to the first exemplary embodiment.

FIG. 7 is a flowchart illustrating details of normal line map generation processing executed by the generation unit 204 in step S604.

In step S701, the detection unit 205 of the generation unit 204 detects face information from the flash light emitted image Ion through the template matching described above.

In step S702, the deformation unit 206 deforms the standard normal line map Ns included in the standard shape information according to the organ position P of the flash light emitted image data Ion to generate the normal line map N. First, the deformation unit 206 acquires a deformation parameter of the standard normal line map Ns based on the organ position P detected in step S701 and an organ position Ps of the standard shape information. The standard normal line map Ns can be deformed through affine transformation or projective transformation. In the present exemplary embodiment, the deformation unit 206 deforms the standard normal line map Ns(u, v) through the affine transformation expressed by the following equation 7.

$$u'=a0u+a1v+a2$$

$$v'=a3u+a4v+a5 \quad \text{Equation 7}$$

The coordinates of each of the organs (the eyes, the nose, and the mouth) represented by the organ position P of the flash light emitted image and the coordinates of each of organs represented by the organ position Ps of the standard shape information are associated with each other, and transformation parameters (a0, a1, a2, a3, a4, a5) are calculated through a least-square method.

Next, the deformation unit 206 deforms the standard normal line map by using the calculated transformation parameters. Then, the deformation unit 206 arranges the deformed standard normal line map on an image having a size that is the same as the size of the flash light emitted image to make the organ position Ps on the standard normal line map conform to the organ position P of the flash light emitted image. Further, the deformation unit 206 stores a null value which represents non-existence of the normal line information in a pixel in a periphery (i.e., non-face area) of the arranged standard normal line map, and specifies this standard normal line map as the normal line map N corresponding to the flash light emitted image data.

After the above-described normal line map generation processing ends, the processing proceeds to processing in step S605 of FIG. 6 executed by the calculation unit 207.

In step S605, the calculation unit 207 calculates the flash light component Ys(i, j) of each pixel (i, j) of the flash light emitted image by using the normal line map N and the light amount characteristic F.

Figure 8:
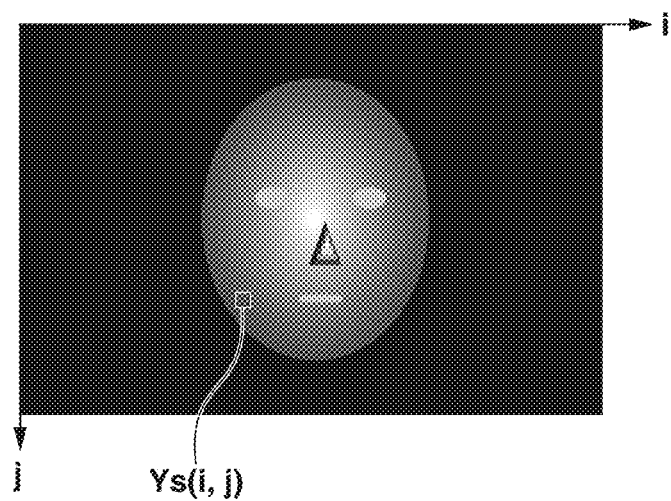
FIG. 8 is a diagram illustrating an example of a flash light component.

FIG. 8 is a diagram illustrating an example of the flash light component. In the present exemplary embodiment, the flash light component refers to the amount of flash light reflected from the object and incident on the optical unit 101 from among the light collected by the optical unit 101. Generally, an amount of light reflected from the object is changed depending on an angle made by an incident direction of light and a normal line direction of a reflection surface even if an amount of incident light is constant. Accordingly, even if the entire object's surface receives flash light with uniform intensity, the flash light component included in the captured image data is changed for each pixel position according to the shape of the object surface. In the present exemplary embodiment, based on a premise that flash light travelling in parallel with the image capturing optical axis of the optical unit 101 is reflected from the object surface according to the Lambert's cosine law, the calculation unit 207 calculates the flash light component Ys(i, j) for each pixel (i, j) of the flash light emitted image through equations 8 and 9.

$$Ys(i,j)=Es^*(N(i,j)\cdot L) \quad \text{Equation 8}$$

$$Es=F(Y\!fon, Y\!foff) \quad \text{Equation 9}$$

Herein, "N(i, j)" in the equation 8 is a unit normal vector stored in the pixel (i, j) of the normal line map N, and "L" is a unit vector of the incident direction of the flash light with respect to the object (i.e., image capturing optical axis direction). Further, "Es" in each of the above equations 8 and 9 represents a flash light amount acquired from the average luminance Yfon of the face area in the flash light emitted image and the average luminance Yfoff of the face area in the flash light non-emitted image by using the light amount characteristic F. However, if a null value which represents non-existence of the normal vector is stored in the pixel (i, j) of the normal line map N, it is assumed that an object plane that reflects flash light does not exist, so that a value of Ys(i, j) becomes 0 (Ys(i, j)=0).

Next, in step S606, the combining unit 208 calculates a combination ratio t(i, j) at each pixel (i, j) through the following equation 10 by using the flash light emitted image data Ion and the flash light component Ys(i, j).

$$t(i,j)=Ys(i,j)/Yon(i,j) \quad \text{Equation 10}$$

Here, "Yon(i, j)" in the equation 10 represents a luminance value calculated from the pixel value IonR(i, j), IonG(i, j), and IonB(i, j) of the flash light emitted image. Then, the combining unit 208 combines the WB corrected image data I'1 for the environmental light and the WB corrected image data I'2 for the flash light at the acquired combination ratio through the following equation 11 to generate the final WB corrected image data I".

$$I''(i,j)=I'1(i,j)^*(1-t(i,j))+I'2(i,j)^*t(i,j) \quad \text{Equation 11}$$

As described above, by using the normal line map of the object which is generated by deforming the standard normal line map and the flash light amount which is estimated from the flash light reflection characteristic based on the luminance of the captured image data, the image processing unit 104 can calculate the flash light component which takes the object shape into consideration. As described above, the image processing unit 104 of the present exemplary embodiment applies a previously stored three-dimensional shape model to the object area in the captured image to generate shape information of the object from the captured image without including disparity information. Then, by calculating the contribution rate of the flash light based on the acquired shape information, the image processing unit 104 of the present exemplary embodiment can appropriately correct the white balance of the image captured in a flash light emitted state without using a distance image of the object.

In the present exemplary embodiment, as the standard shape information, the standard normal line map is read from the ROM 116. However, polygon data representing a general shape of the face surface may be read from the ROM 116. In this case, the standard normal line map can be generated from a normal line of a plane represented by the polygon data.

Further, in the above-described exemplary embodiment, a human face is described as an example of the specific object. However, the specific object is not limited to the human face. For example, a three-dimensional shape model having a feature point is previously provided for the specific object, and the specific object area and the feature point are detected from the flash light emitted image data by using a known object detection method. In this way, the present exemplary embodiment is also applicable to the object other than the face. The above-described configuration is similarly applicable to the second exemplary embodiment described below.

In the first exemplary embodiment, a method of acquiring a flash light amount received by the object based on the luminance of the face area in the flash light emitted state and the luminance thereof in the flash light non-emitted state has been described. Further, in the first exemplary embodiment, the WB correction coefficient for the environmental light is calculated by using captured image data acquired in the flash light non-emitted state.

In a second exemplary embodiment, a flash light amount received by an object is estimated acquired) based on a positional relationship between a flash light source and the object. Further, in the present exemplary embodiment, by using a flash light component of a captured image, a WB correction coefficient for environmental light is calculated from captured image data acquired in a flash light emitted state.

Figure 9:
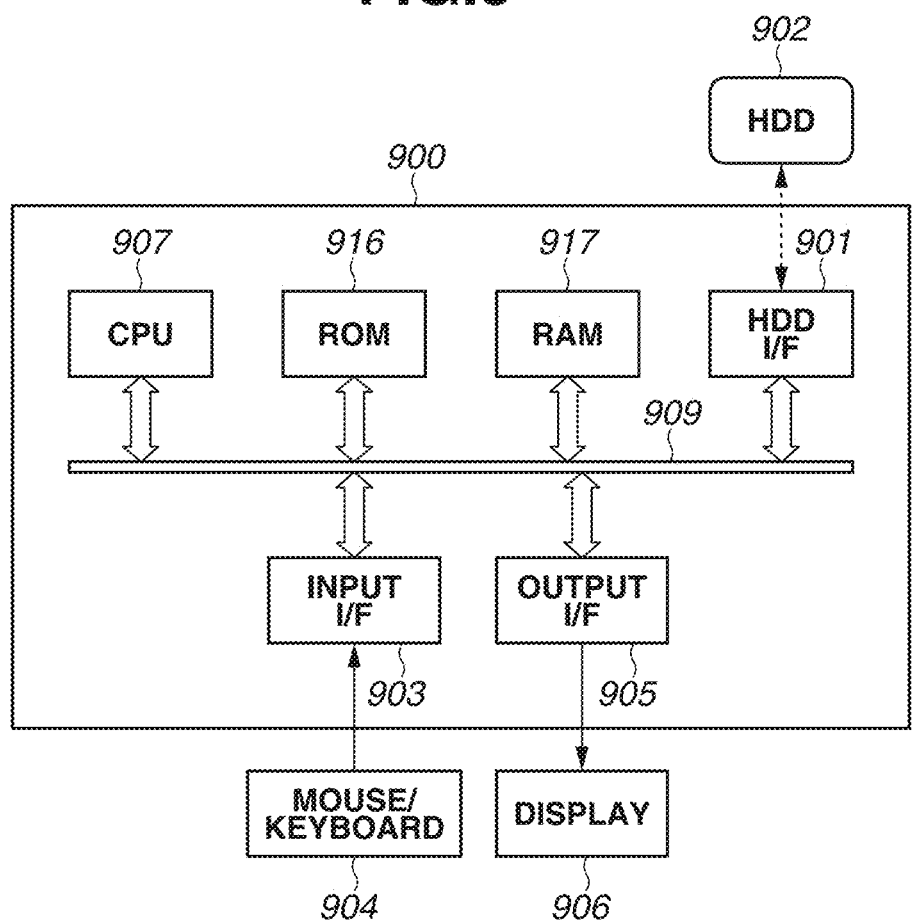
FIG. 9 is a block diagram illustrating a configuration example of an image processing apparatus according to a second exemplary embodiment.

FIG. 9 is a block diagram illustrating an example of a hardware configuration of a PC 900 serving as an image processing apparatus according to the present exemplary embodiment.

The PC 900 is configured of a CPU 907, a system bus 909, a ROM 916, a RAM 917, a hard disk drive (HDD) I/F 901, an input I/F 903, and an output I/F 905. The HDD I/F 901 is an interface such as a serial advanced technology attachment (SATA) interface which connects a secondary storage apparatus such as an HDD 902 or an optical disk drive to the PC 900. The CPU 907 reads and writes data from/to the HDD 902 via the HDD I/F 901. Further, the CPU 907 can load data stored in the HDD 902 to the RAM 917 and save the data loaded on the RAM 917 in the HDD 902. The input I/F' 903 is a serial bus interface such as a USB which connects an input device such as a mouse/keyboard 904 to the PC 900. The CPU 907 can read various signals from the mouse/keyboard 904 via the input I/F 903. The output I/F 905 is a video image output interface such as a digital visual interface (DVI) which connects a display device such as a display 906 to the PC 900. The CPU 907 can transmit data to the display 906 via the output I/F 905 to display information. Further, by using a bidirectional communication interface such as a USB or a serial bus compliant with the standard of the Institute of Electrical and Electronics Engineers (IEEE) 1394, the input I/F 903 and the output I/F 905 can be integrally provided. In the present exemplary embodiment, the CPU 907 functions as an image processing unit. Further, it is assumed that the flash light emitted image data is previously stored in the ROM 916 or the HDD 902 in an image file format including photographic metadata, e.g., an exchangeable image file format (Exif), in addition to the standard shape information and the light amount characteristic.

Figure 10:
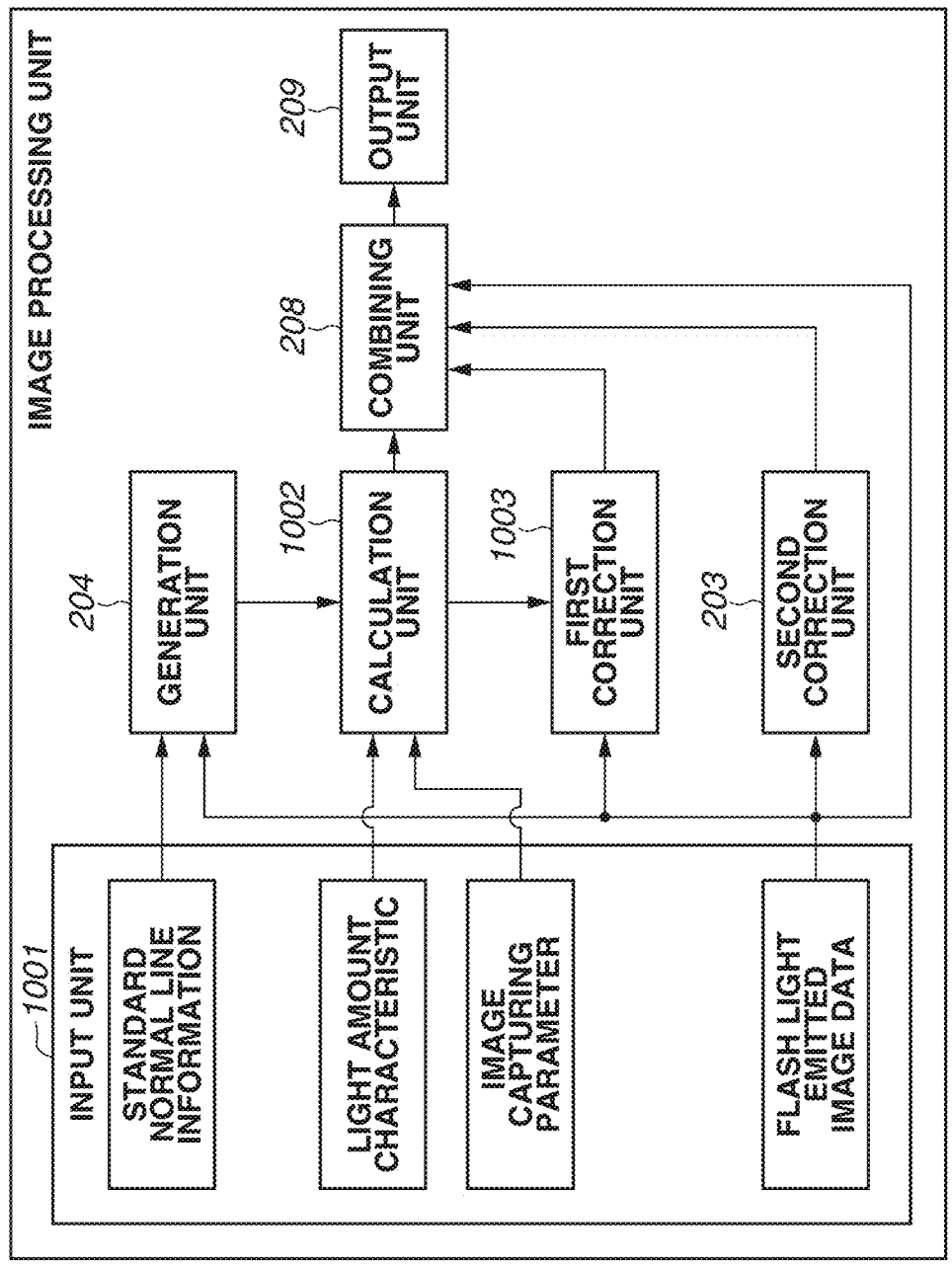
FIG. 10 is a block diagram illustrating a configuration example of an image processing unit according to the second exemplary embodiment.

FIG. 10 is a functional block diagram which enables the PC 900 illustrated in FIG. 9 to function as the image processing apparatus according to the present exemplary embodiment. In FIG. 10, a second correction unit 203, a generation unit 204, a combining unit 208, and an output unit 209 execute processing similar to the processing executed by the corresponding constituent elements described in FIG. 2, so that descriptions thereof will be omitted. Hereinafter, the processing different from the processing described in the first exemplary embodiment will be mainly described briefly.

In the present exemplary embodiment, an input unit 1001 reads and acquires flash light emitted image data, standard shape information, and a light amount characteristic from the ROM 916 or the HDD 902. Herein, the light amount characteristic according to the present exemplary embodiment refers to a characteristic which represents an amount of flash light received by the object according to a distance and a direction from the flash light source (i.e., three-dimensional positional information with respect to the flash light source). Specifically, the light amount characteristic of the present exemplary embodiment is a function F'(x, y, z) which takes three-dimensional position coordinates (x, y, z) of an object as an input and provides a flash light amount Es' received by the object existing in the three-dimensional position coordinates (x, y, z) as an output.

Further, the input unit 1001 acquires a focus distance f and a distance to the object (i.e., object distance D) from metadata of the acquired flash light emitted image data. Further, based on the Exif information, the input unit 1001 specifies a type of the image capturing apparatus that captures the flash light emitted image data, and refers to a previously-provided database to acquire a size (H, W) of the image sensor. In the present exemplary embodiment, the focus distance f, the object distance D, and the image sensor size (i.e., a height H and a width W) are used as the image capturing parameters. Generally, the object distance D can be acquired based on a focus distance and a focus lens position at the time of executing image capturing.

The acquired flash light emitted image data is transmitted to a first correction unit 1003, the second correction unit 203, the generation unit 204, and the combining unit 208. Further, the standard shape information is transmitted to the generation unit 204. Furthermore, the light amount characteristic and the image capturing parameter are transmitted to a calculation unit 1002.

The calculation unit 1002 according to the present exemplary embodiment calculates the flash light component for the flash light emitted image data by using the light amount characteristic and the image capturing parameters acquired by the input unit 1001 and the normal line map generated by the generation unit 204 as described above. This calculation processing will be described below in detail. The calculated flash light component is transmitted to the combining unit 208.

The first correction unit 1003 according to the present exemplary embodiment calculates a WB correction coefficient for the environmental light by using the flash light emitted image data acquired by the input unit 1001 and the flash light component calculated by the calculation unit 1002. This calculation processing will be described below in detail. Further, the first correction unit 1003 generates WB corrected image data for the environmental light from the flash light emitted image data by using that WB correction coefficient. Then, the generated WB corrected image data for the environmental light is transmitted to the combining unit 208.

Figure 11:
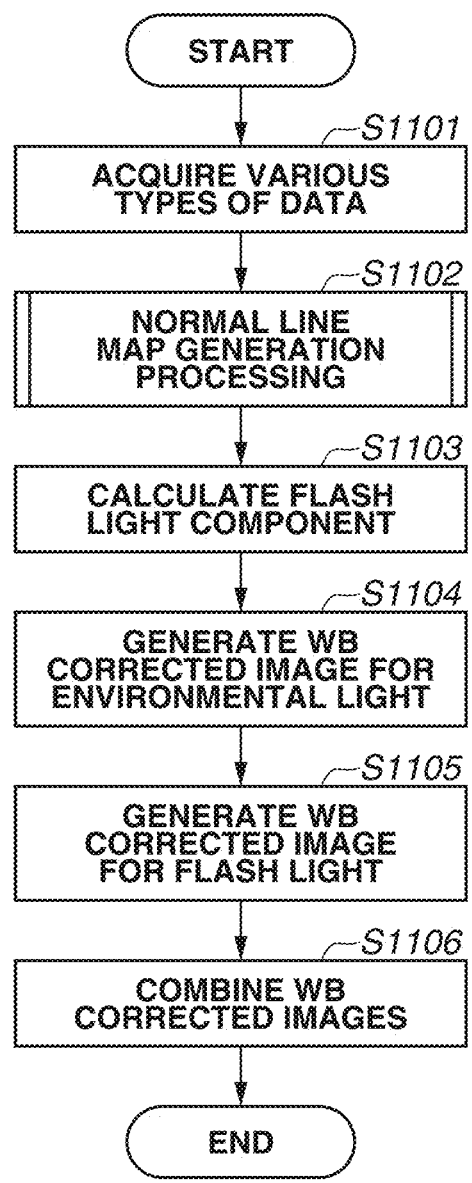
FIG. 11 is a flowchart of image processing according to the second exemplary embodiment.

FIG. 11 is a flowchart illustrating a series of processing executed by the image processing apparatus according to the present exemplary embodiment.

First, in step S1101, the input unit 1001 acquires the flash light emitted image data, the standard shape information, the light amount characteristic, and the image capturing parameter, and transmits the acquired data and information to units which execute subsequent processing.

The processing executed in step S1102 is similar to the processing executed in step S604 of the first exemplary embodiment, so that descriptions thereof will be omitted.

Next, in step S1103, the calculation unit 1002 acquires the three-dimensional coordinates of the object corresponding to each pixel in the flash light emitted image based on the image capturing parameters, and calculates the flash light component by using the three-dimensional coordinates, the light amount characteristic, and the normal line map.

In the present exemplary embodiment, a position of the flash light source and a light emitting optical axis are respectively treated the same as a position of the image capturing apparatus and an image capturing optical axis. Further, a distance in a depth direction from the flash light source to the object is approximated by the object distance D included in the image capturing parameters. Thereafter, the calculation unit 1002 calculates the three-dimensional coordinates (x(i, j), y(i, j), z(i, j)) of the object corresponding to the pixel position (i, j) through the following equations 12 to 14. As expressed by the equations 12 to 14, the calculation unit 1002 calculates the three-dimensional coordinates (x(i, j), y(i, j), z(i, j)) by using the focus distance f and the image sensor size (H, W) included in the image capturing parameters.

$$x(i,j)=(i-W/2)*D/f \quad \text{Equation 12}$$

$$y(i,j)=(j-H/2)*D/f \quad \text{Equation 13}$$

$$z(i,j)=D \quad \text{Equation 14}$$

Then, the calculation unit 1002 calculates the flash light component Ys(i, j) corresponding to each pixel (i, j) of the flash light emitted image data through the following equations 15 to 17.

$$Ys(i,j)=Es'(i,j)*Refl(i,j) \quad \text{Equation 15}$$

$$Es'(i,j)=F'(x(i,j),y(i,j),z(i,j)) \quad \text{Equation 16}$$

$$Refl(i,j)=(N(i,j)*L(i,j))*Cd+(L(i,j)*R(i,j))^n*Cs \quad \text{Equation 17}$$

In the above equations, "Es'(i, j)" represents a flash light amount acquired from the three-dimensional coordinates of the object corresponding to the pixel (i, j) by using the light amount characteristic F'. Further, the equation 17 expresses a known reflection model, i.e., the Phong specular reflection model, and "Refl(i, j)" is a reflection amount of light calculated by the reflection model. In the Equation 17, "L(i, j)" is a unit vector heading toward the flash light source position from the object position. Further, "R(i, i)" is a unit vector which represents a specular direction of a line-of-sight vector heading toward the object position from the image capturing apparatus with respect to the object surface.

Figure 12:
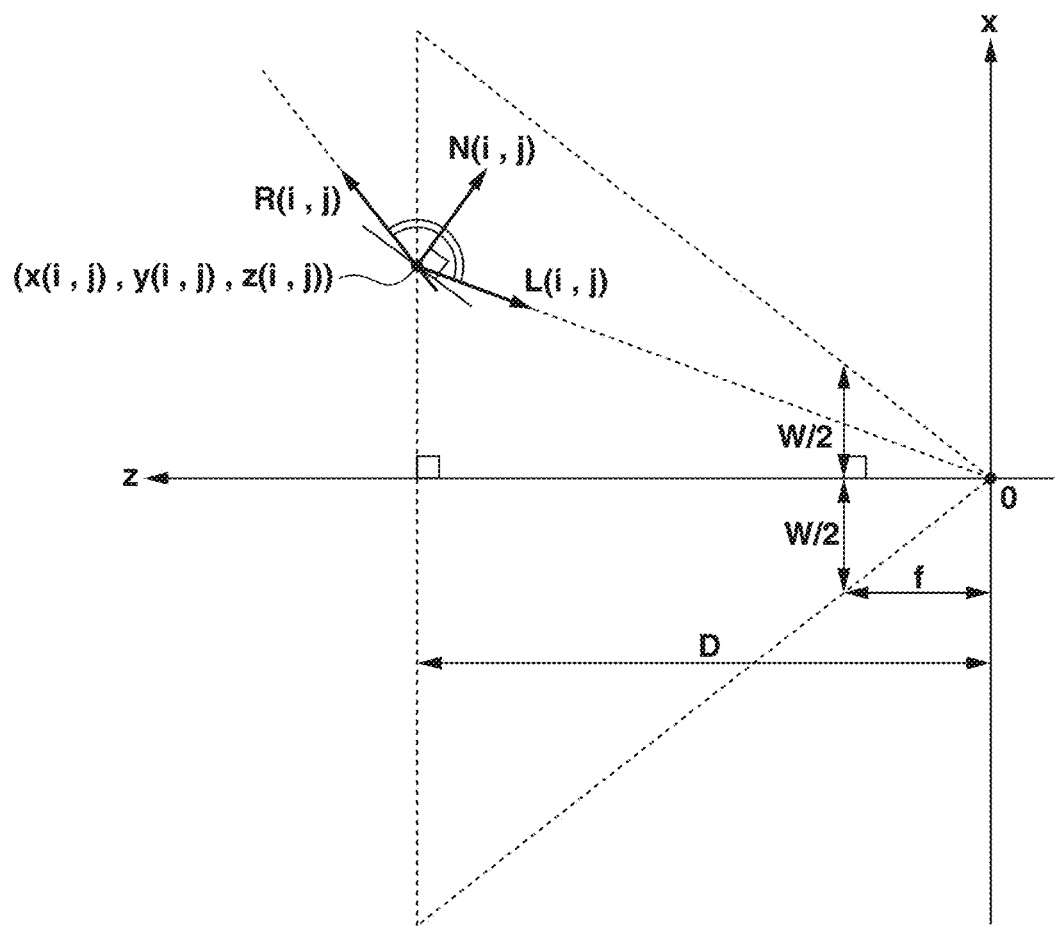
FIG. 12 is a diagram illustrating a positional relationship between an object and a light source.

FIG. 12 is a diagram illustrating examples of the above-described vectors. In FIG. 12, an origin 0 represents a position of the image capturing apparatus and the flash light source. Each of the vectors L(i, j) and R(i, j) can be calculated based on the positional relationship between the object and the image capturing apparatus or the flash light source. Further, in the equation 17, "Cd" represents diffuse reflectance of the object, whereas "Cs" represents specular reflectance of the object. Values previously set based on the general skin reflectance may be used for the above-described reflectance.

In step S1104, the first correction unit 1003 generates WB corrected image data for the environmental light from the flash light emitted image data. The above processing is different from the processing in the first exemplary embodiment in that the WB correction coefficient for the environmental light is calculated by using the flash light emitted image data and the flash light component. It is assumed that, in the flash-light emitted image data, RGB values of a pixel receiving small contribution of flash light represent color information significantly reflecting environmental light. Therefore, in the present exemplary embodiment, the first correction unit 1003 extracts a pixel having the flash light component Ys(i, j) less than or equal to a predetermined threshold value from the flash light emitted image data. Then, the first correction unit 1003 calculates averages of RGB values of the pixels to acquire the average RGB values aveIoffR, aveIoffG, and aveIoffB described in step S602 of the first exemplary embodiment. The first correction unit 1003 specifies the WB correction coefficient calculated through the above-described equations 1 to 3 by using the calculated average RGB values as the WB correction coefficient for the environmental light. The processing for generating the WB corrected image data by using the WB correction coefficient is similar to the processing in the first exemplary embodiment, so that description thereof is omitted.

The pieces of processing executed in subsequent steps S1105 and S1106 are similar to the respective pieces of the processing executed in steps S603 and S606 of the first exemplary embodiment, so that descriptions thereof will be omitted.

By executing the above-described processing control, the image processing apparatus of the present exemplary embodiment can calculate a flash light component with higher accuracy, which takes the positional relationship between the flash light source and the object into consideration. Further, the image processing apparatus of the present exemplary embodiment can generate the WB corrected image data for the environmental light without acquiring image data captured in a flash light non-emitted state.

In the present exemplary embodiment, although the Phong specular reflection model is used for calculating the reflection amount through the equation 17 in step S1103, another reflection model such as the Blinn-Phong model or the Torrance-Sparrow model can also be used.

Further, in the present exemplary embodiment, the object distance D is acquired from the Exif information. However, the object distance D may be acquired through another method. For example, an LUT which associates a size of the face area with respect to a view angle of the captured image with an object distance is previously stored in the ROM 916. Then, the object distance D may be acquired with reference to this LUT based on a size of a face area and an imaging view angle detected from the flash light emitted image data. The imaging view angle can be calculated from the focus distance f and the image sensor size (H, W).

Other Exemplary Embodiments

In order to execute the processing, trained models trained through machine learning may be used in place of the above-described processing units such as the first correction unit 202 and the second correction unit 203. In this case, for example, a plurality of combinations of input data and output data with respect to the processing unit is prepared as learning data, and a trained model which acquires knowledge from the learning data through machine learning and outputs data as a result with respect to input data based on the acquired knowledge is generated. For example, the trained model can be configured of a neural network model. With respect to the case described in the first exemplary embodiment, for example, two trained models are used. A trained model trained by using a captured image as input data and the WB corrected image data I'1 for environmental light described in the above exemplary embodiment as output data is used as the first correction unit 202. Further, a trained model trained by using a captured image as input data and the WB corrected image data I'2 for flash light described in the above exemplary embodiment as output data is used as the second correction unit 203. By using the above-described trained models, a corrected image in which color of the captured image is corrected according to the environmental light is output from the first correction unit 202, and a corrected image in which color of the captured image is corrected according to the flash light is output from the second correction unit 203.

The trained models applied to the respective correction units 202 and 203 serve as programs for executing processing equivalent to the processing executed by the processing units, and cooperatively operate with a CPU or a graphics processing unit (CPU) to execute the processing of the processing units. In addition, the above-described trained models may be updated as necessary after a certain amount of processing is executed.

In the above-described exemplary embodiments, the image processing apparatus is applied to an image capturing apparatus such as a digital camera. However, the image capturing apparatus is not limited to a digital camera. The image capturing apparatus may be any one of an information terminals of various types having a digital camera function (i.e., a personal computer, a tablet terminal, a smartphone, and a handheld game), a camcorder, an in-vehicle camera, a monitoring camera, a medical camera, and an industrial camera.

Embodiments of the present disclosure can be realized through processing in which a program for realizing one or more functions according to the above-described exemplary embodiments is supplied to a system or an apparatus via a network or a storage medium, so that one or more processors in the system or the apparatus read and execute the program. Further, embodiments of the present disclosure can be also realized with a circuit (e.g., application specific integrated circuit (ASIC)) that realizes one or more functions.

The above-described exemplary embodiments are merely the examples embodying the present disclosure and shall not be construed as limiting the technical range of the present disclosure. In other words, embodiments of the present disclosure can be realized in diverse ways without departing from the technical spirit or main features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-095935, filed May 22, 2019, which is hereby incorporated by reference herein in its entirety.

What is claimed is:

1. An image processing apparatus comprising:
one or more processors; and
at least one memory storing executable instructions, which when executed by the one or more processors, cause the image processing apparatus to:
acquire an image captured in a state where auxiliary light is emitted under environmental light;
generate shape information of an object by applying a three-dimensional shape model to an area of the object included in the captured image;
acquire an auxiliary light component representing intensity of the auxiliary light at each pixel of the captured image based on a light amount characteristic representing a light amount of the auxiliary light received by the object when the auxiliary light is emitted and the shape information of the object;
generate a first corrected image in which color of the captured image is corrected according to the environmental light, wherein the first corrected image is generated by correcting the captured image by using a white balance correction coefficient for the environmental light, and wherein the white balance correction coefficient for the environmental light is calculated based on a pixel value of a pixel in which the acquired auxiliary light component is less than or equal to a predetermined threshold value, the pixel being extracted from the captured image;
generate a second corrected image in which color of the captured image is corrected according to the auxiliary light; and
combine the first corrected image and the second corrected image at a combination ratio based on the auxiliary light component.

2. The image processing apparatus according to claim 1, wherein the second corrected image is generated by correcting the captured image by using a white balance correction coefficient for the auxiliary light.

3. The image processing apparatus according to claim 1, wherein the executable instructions, when executed by the one or more processors, further cause the image processing apparatus to:
detect a position of an organ of a human face as the object from the captured image, and deform and apply the three-dimensional shape model to make a position of an organ of a face of the three-dimensional shape model substantially conform to the detected position.

4. The image processing apparatus according to claim 1, wherein the executable instructions, when executed by the one or more processors, further cause the image processing apparatus to:
detect a position of a specific object area from the captured image based on a feature point of an image, and deform and apply the three-dimensional shape model to make a position of a specific object area of the three-dimensional shape model substantially conform to the detected position.

5. The image processing apparatus according to claim 1, wherein the shape information is normal line information of an object surface corresponding to each pixel of the captured image.

6. The image processing apparatus according to claim 1, wherein the light amount characteristic is a characteristic which represents a light amount of the auxiliary light received by the object according to three-dimensional position information of the object with respect to a light source of the emitted auxiliary light.

7. The image processing apparatus according to claim 1, wherein the executable instructions, when executed by the one or more processors, further cause the image processing apparatus to:
acquire an auxiliary light component representing an intensity of auxiliary light at each pixel of the captured image based on a premise that auxiliary light received by the object when the auxiliary light is emitted is reflected from a surface of the object according to the Lambert's cosine law.

8. An image processing method executed by an image processing apparatus comprising:
acquiring, through image acquisition, an image captured in a state where auxiliary light is emitted under environmental light;
generating shape information of an object by applying a three-dimensional shape model to an area of the object included in the captured image;
acquiring, through component acquisition, an auxiliary light component representing intensity of the auxiliary light at each pixel of the captured image based on a light amount characteristic representing a light amount of the auxiliary light received by the object when the auxiliary light is emitted and the shape information of the object;
generating, through first correction, a first corrected image in which color of the captured image is corrected according to the environmental light, wherein the first correction generates the first corrected image by correcting the captured image by using a white balance correction coefficient for the environmental light, and wherein the white balance correction coefficient for the environmental light is calculated based on a pixel value of a pixel in which the acquired auxiliary light component is less than or equal to a predetermined threshold value, the pixel being extracted from the captured image;
generating, through second correction, a second corrected image in which color of the captured image is corrected according to the auxiliary light; and
combining the first corrected image and the second corrected image at a combination ratio based on the auxiliary light component.

9. The image processing method according to claim 8, wherein the second correction generates the second corrected image by correcting the captured image by using a white balance correction coefficient for the auxiliary light.

10. The image processing method according to claim 8, wherein the generating shape information detects a position of an organ of a human face as the object from the captured image, and deforms and applies the three-dimensional shape model to make a position of an organ of a face of the three-dimensional shape model substantially conform to the detected position.

11. The image processing method according to claim 8, wherein the generating shape information detects a position of a specific object area from the captured image based on a feature point of an image, and deforms and applies the three-dimensional shape model to make a position of a specific object area of the three-dimensional shape model substantially conform to the detected position.

12. The image processing method according to claim 8, wherein the shape information is normal line information of an object surface corresponding to each pixel of the captured image.

13. The image processing method according to claim 8, wherein the component acquisition acquires an auxiliary light component representing an intensity of auxiliary light at each pixel of the captured image based on a premise that auxiliary light received by the object when the auxiliary light is emitted is reflected from a surface of the object according to the Lambert's cosine law.

14. A non-transitory computer-readable storage medium storing a program causing a computer to execute an image processing method, the method comprising:
acquiring, through image acquisition, an image captured in a state where auxiliary light is emitted under environmental light;
generating shape information of an object by applying a three-dimensional shape model to an area of the object included in the captured image;
acquiring, through component acquisition, an auxiliary light component representing intensity of the auxiliary light at each pixel of the captured image based on a light amount characteristic representing a light amount of the auxiliary light received by the object when the auxiliary light is emitted and the shape information of the object;
generating, through first correction, a first corrected image in which color of the captured image is corrected according to the environmental light, wherein the first corrected image is generated by correcting the captured image by using a white balance correction coefficient for the environmental light, and wherein the white balance correction coefficient for the environmental light is calculated based on a pixel value of a pixel in which the acquired auxiliary light component is less than or equal to a predetermined threshold value, the pixel being extracted from the captured image;
generating, through second correction, a second corrected image in which color of the captured image is corrected according to the auxiliary light; and
combining the first corrected image and the second corrected image at a combination ratio based on the auxiliary light component.

* * * * *